United States Patent
Bernardi

(10) Patent No.: US 8,371,329 B2
(45) Date of Patent: Feb. 12, 2013

(54) PILOT DEVICE WITH REMOTE PRESSURE CONTROL FOR GAS PRESSURE REGULATORS

(75) Inventor: Michele Bernardi, Selvazzano Dentro (IT)

(73) Assignee: Pietro Fiorentini, S.p.A, Arcugnano (VI) (IT)

( * ) Notice: Subject to any disclaimer, the term of this patent is extended or adjusted under 35 U.S.C. 154(b) by 403 days.

(21) Appl. No.: 12/671,540

(22) PCT Filed: Aug. 1, 2008

(86) PCT No.: PCT/EP2008/060189
§ 371 (c)(1), (2), (4) Date: Feb. 22, 2010

(87) PCT Pub. No.: WO2009/019237
PCT Pub. Date: Feb. 12, 2009

(65) Prior Publication Data
US 2010/0155631 A1 Jun. 24, 2010

(30) Foreign Application Priority Data
Aug. 3, 2007 (IT) .............................. VI2007A0218

(51) Int. Cl.
*F16K 17/38* (2006.01)
(52) U.S. Cl. .............. 137/468; 137/505.14; 137/505.18; 137/505.22; 137/505.36
(58) Field of Classification Search ............... 137/468, 137/505.14, 505.18, 505.22, 505.36
See application file for complete search history.

(56) References Cited

U.S. PATENT DOCUMENTS

| | | | | |
|---|---|---|---|---|
| 1,745,256 A * | 1/1930 | Groble | ........................ | 137/484.2 |
| 2,261,364 A * | 11/1941 | Grove | ............................ | 137/341 |
| 2,833,303 A * | 5/1958 | Leutwiler et al. | ............. | 137/495 |
| 5,174,326 A * | 12/1992 | Steinert et al. | ................ | 137/468 |
| 5,423,342 A * | 6/1995 | Fenner, Jr. | ....................... | 137/14 |
| 5,595,209 A * | 1/1997 | Atkinson et al. | ............ | 137/116.5 |
| 6,516,827 B1 * | 2/2003 | Bouvier | ........................ | 137/468 |
| 7,578,310 B2 * | 8/2009 | Teliszczuk et al. | ............ | 137/489 |

FOREIGN PATENT DOCUMENTS

| | | |
|---|---|---|
| EP | 0522434 A | 1/1993 |
| FR | 2451597 A | 10/1980 |

* cited by examiner

*Primary Examiner* — Craig Schneider
*Assistant Examiner* — Jessica Cahill
(74) *Attorney, Agent, or Firm* — IP Strategies

(57) ABSTRACT

A pilot device cooperates with a gas pressure regulator suitable for use in gas distribution systems and consists of: a head with two chambers separated by a first membrane, one chamber at the gas pressure regulator outlet pressure and the other at atmospheric pressure; a body with elastic means and an axial thrust unit acting on the first membrane and cooperating with a regulation unit having at the inlet a supply pressure and at the outlet the motorization gas which is transferred to the motorization chamber of the gas pressure regulator. The pilot device features a tank having a wall with a further membrane provided with the mechanical elastic setting means. Gas is conveyed into the tank with a load pressure to modify the thrust of the elastic setting means. The device has a closed compensation chamber at atmospheric pressure, having the further membrane in common with the tank.

8 Claims, 3 Drawing Sheets

PILOT DEVICE WITH REMOTE PRESSURE CONTROL FOR GAS PRESSURE REGULATORS

FIELD OF THE INVENTION

The present invention concerns a pilot device with remote pressure control for gas pressure regulators used in particular in natural gas distribution systems.

BACKGROUND OF THE INVENTION

As is known, when natural gas is extracted from the natural gas fields, it is conveyed to the users by means of suitable transport and distribution systems. To guarantee safety and continuity of gas delivery to the users, the pressure at the users themselves must be maintained as constant as possible irrespective of the variations in the required flow rate and in the feeding pressure at higher value.

Said conditions are achieved by the use of gas pressure regulators which, supplied with the gas coming from pipelines at a higher pressure, convey gas at a lower and practically constant pressure to the users.

A gas pressure regulator of known type comprises a valve body which includes a high pressure chamber connected to a gas supply duct and a low pressure chamber connected to a gas outlet duct.

The gas flows from the high pressure chamber to the low pressure chamber via a communication passage between the two chambers, combined with a movable shutter suitable for regulating the gas flow rate, connected, in turn, to control means.

When the pressure in the outlet duct drops with respect to the rated value, the shutter opens the communication passage to increase the outflow of gas, thus increasing the pressure in the outlet duct until it reaches a value near the rated value.

According to one of the known techniques, the above shutter control means comprise a control head inside which there is a membrane that divides the inner volume of the head into two chambers, one upper chamber which receives, via appropriate pipes, the outlet pressure of the regulation valve, and one lower chamber, called in technical jargon motorization chamber, in which the motorization gas arrives at a pressure which, with the shutter not in the closed position, is always higher than that of the upper chamber.

The pressure of the motorization gas exerts a thrust on the membrane opposing the thrust of the elastic means connected to the membrane and associated with the shutter.

Furthermore, the gas contained in the motorization chamber flows out via a small hole in the chamber connected to the outlet duct of the regulation valve and therefore into the outlet duct itself.

According to the pressure in the motorization chamber, the shutter opens, or remains motionless or consequently closes.

According to the known technique, said elements as described above are associated with pilot devices which supply the motorization gas to the motorization chamber. Examples of known pilot devices are given in documents EP 0 522 434 A1 and FR 2 451 597 A.

The assembly of the three parts, i.e. the body, control head and pilot, forms what is commonly called "piloted pressure regulator" in technical jargon.

More specifically, the sector uses the term pilot-controlled gas pressure regulators to indicate gas pressure regulators that include a pilot device.

It is evident that the pressure and/or flow rate of the motorization gas supplied by the pilot commands and controls the gas pressure regulator according to the variations in external variables such as the required flow rate and the pressure in the inlet duct, so as to maintain the outflow pressure constant via appropriate regulation of the pressure and/or flow rate of the motorization gas in the regulator motorization chamber.

It is also possible to control and/or change the flow rate at the gas pressure regulator outlet, the flow rate depending on an algorithm which correlates the inlet pressure, the pressure downstream of the regulator and the degree of opening of the regulator shutter.

Therefore, by modifying the pressure and/or flow rate of the motorization gas, which flows out of the pilot and which reaches the motorization chamber of the regulator head, the flow rate delivered by the gas pressure regulator can be modified accordingly.

A further use of the pilot-controlled gas pressure regulator, and therefore of the pilot, is that of changing the outlet pressure according to the gas consumption required downstream.

This is also obtained by changing the setting of the pilot and consequently also the pressure and/or flow rate of the motorization gas, which appropriately controls the gas pressure regulator shutter so as to regulate the downstream pressure to the new value.

Another use of a pilot-controlled gas pressure regulator is that of providing initial summary information regarding the flow rate through the pressure regulator, for example in order to balance the networks.

In fact, according to the algorithm which correlates the inlet pressure, the pressure downstream of the gas pressure regulator and the degree of opening of the gas pressure regulator shutter, it is possible to identify the flow rate and therefore obtain the required information.

Naturally, once the flow rate is known, it can be modified, again by varying the pressure and/or flow rate of the motorization gas delivered by the pilot.

The pilots are generally remote-controlled in order to allow operations to be carried out on the gas pressure regulator to obtain one of the above mentioned conditions.

The pilots can be remote-controlled by means of electric servo mechanisms, or by means of a load pressure sent to a tank associated with the pilot and which interacts with the elastic membrane with which the thrust of the mechanical elastic setting means (helical spring) also interacts.

In this way, the thrust of the load pressure is added to the thrust of the mechanical elastic setting means, therefore substantially varying the setting of the pilot and consequently establishing a new setting for the pressure and/or flow rate of the motorization gas flowing out of the pilot.

In this case the mechanical elastic setting means guarantee a minimum basic setting; by varying the load pressure in the tank associated with the pilot, it is possible to increase the setting beyond the preceding basic limit.

Pilots which are remote-controlled by means of a load pressure are widely used for obvious reasons of cost and safety (in any electric servomechanism it is necessary to eliminate any risk of ignition potentially explosive atmospheres due to the presence of the fuel gas).

From now on, the pilot with remote control associated with tank with load pressure will be simply called "pilot device".

Despite the considerable levels of safety and of reliability of the remote control devices for regulation of the load pressure in the tank associated with the pilot, said control devices can break down or there may be an interruption in their external power supply.

In this specific case the pilot device undergoes the effects of temperature variation due both to the diurnal temperature range (maximum exposure to sunlight in the day and drop in temperature at night, especially for non-protected outdoor installations), and to particular atmospheric events.

It is important to bear in mind that while these temperature variations do not affect the basic setting correlated with the mechanical elastic means, they affect the additional thrust deriving from the pressure of the load gas (since it is contained in a closed chamber) and, therefore the setting value of the pilot device immediately prior to occurrence of a failure.

As a result, the setting of the pressure and/or flow rate of the motorization gas supplied to the gas pressure regulator is no longer under control and unsafe conditions can therefore arise in the event of both increase and decrease in the temperature.

BRIEF SUMMARY OF THE INVENTION

The main object of the present invention is to produce a pilot device which ensures that the setting value and therefore the safe operating conditions immediately prior to occurrence of a fault and/or interruption of the energy supply by the external source to the system which controls and provides the load pressure of the tank associated with the pilot are kept.

The invention aims in particular to make the behaviour of the pilot device, and consequently of the gas pressure regulator connected to it, practically independent of the effect of the temperature variation in the event of breakdown of the loading pressure regulation system.

The above object and others which will be better highlighted below, are achieved by a pilot device cooperating with a gas pressure regulator, the main characteristics of which are in accordance with the contents of the first claim. Further detail characteristics of the pilot device of the invention are described in the dependent claims.

More precisely, the pilot device of the invention comprises a tank supplied with a load pressure which acts on the elastic membrane present in the tank, said tank being provided with a membrane wall.

The basic setting mechanical elastic means also interact with this membrane wall.

Said membrane wall is shared with a closed compensation chamber kept at atmospheric pressure.

As will be illustrated below, the variation in the thrust exerted on the elastic membrane due to the variation in temperature is practically annulled due to the effect of the compensation chamber.

The non-influence of the temperature variation on the pilot device is very significant also due to the low pressures present in the pilot load tank which can vary from a few dozen mbars to a few hundred mbars.

BRIEF DESCRIPTION OF THE DRAWINGS

Further characteristics and particular features of the invention will be better highlighted in the description of the preferred embodiment of the pilot device carried out according to the invention, provided by way of non-limiting example and illustrated in the following drawings, wherein.

DETAILED DESCRIPTION OF THE INVENTION

Figure 1:
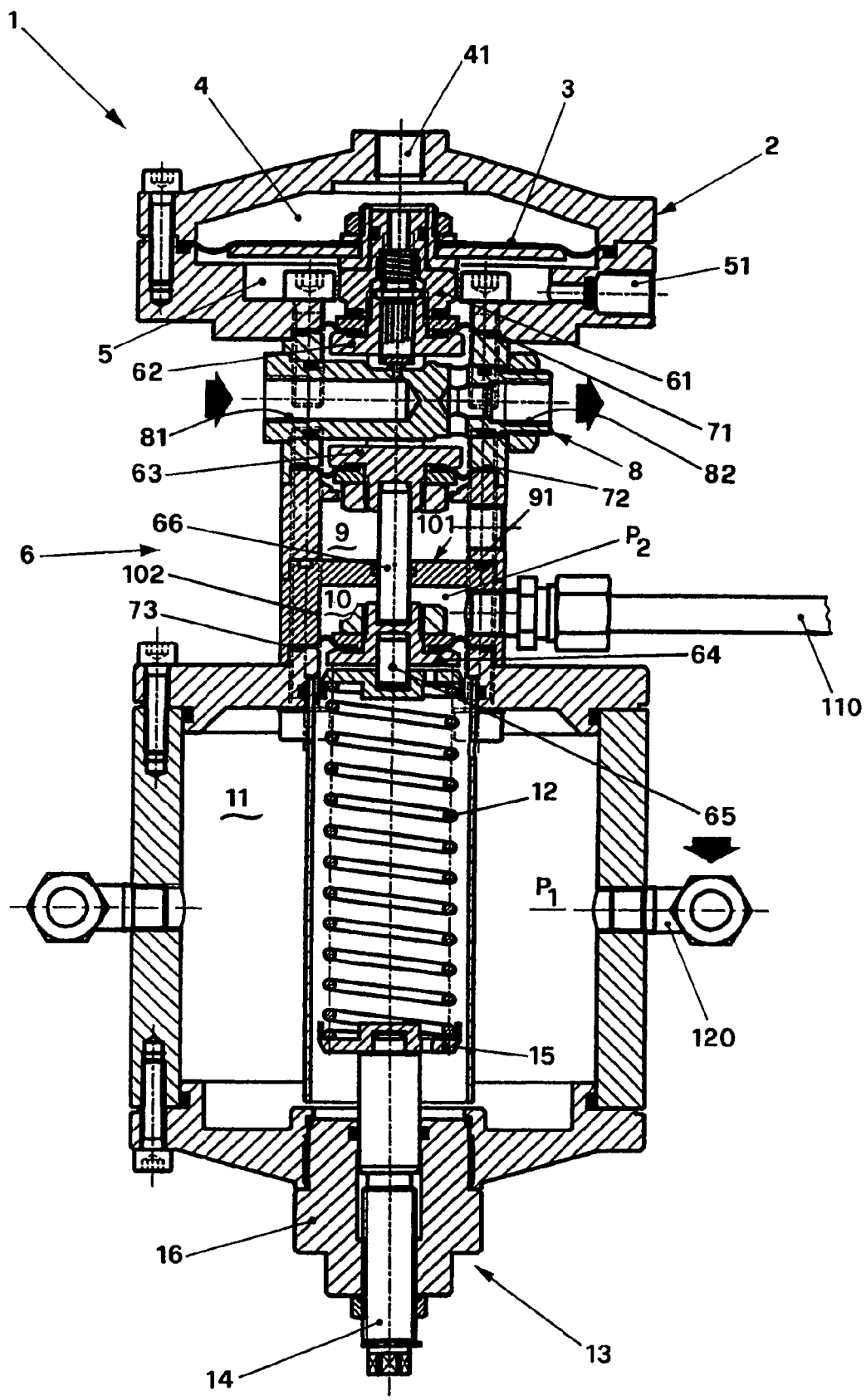
FIG. 1 shows a cross section of the pilot device carried out according to the invention.
Figure 2:
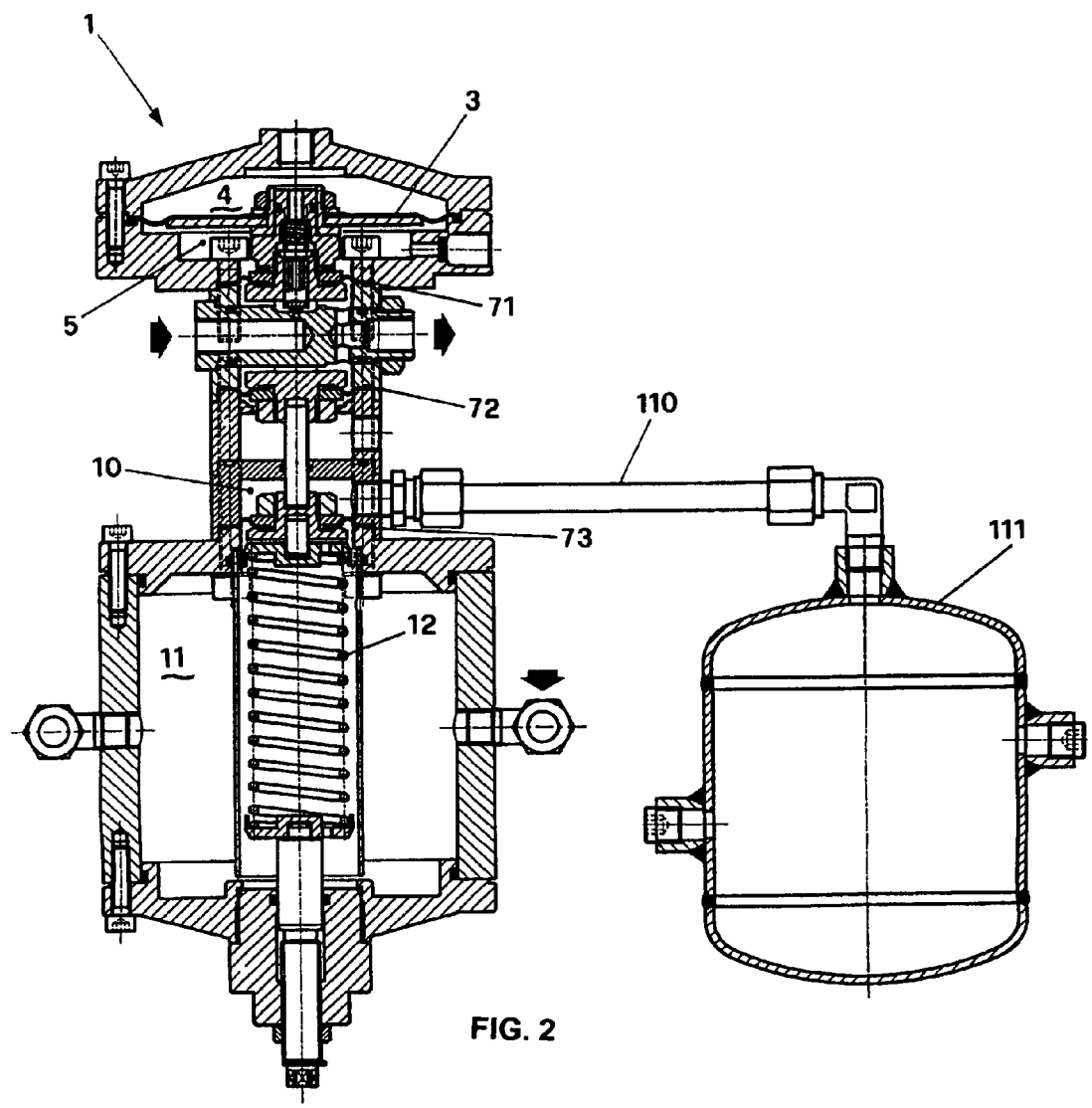
FIG. 2 shows a further cross section of the pilot device of the invention connected to an additional tank.
Figure 4:
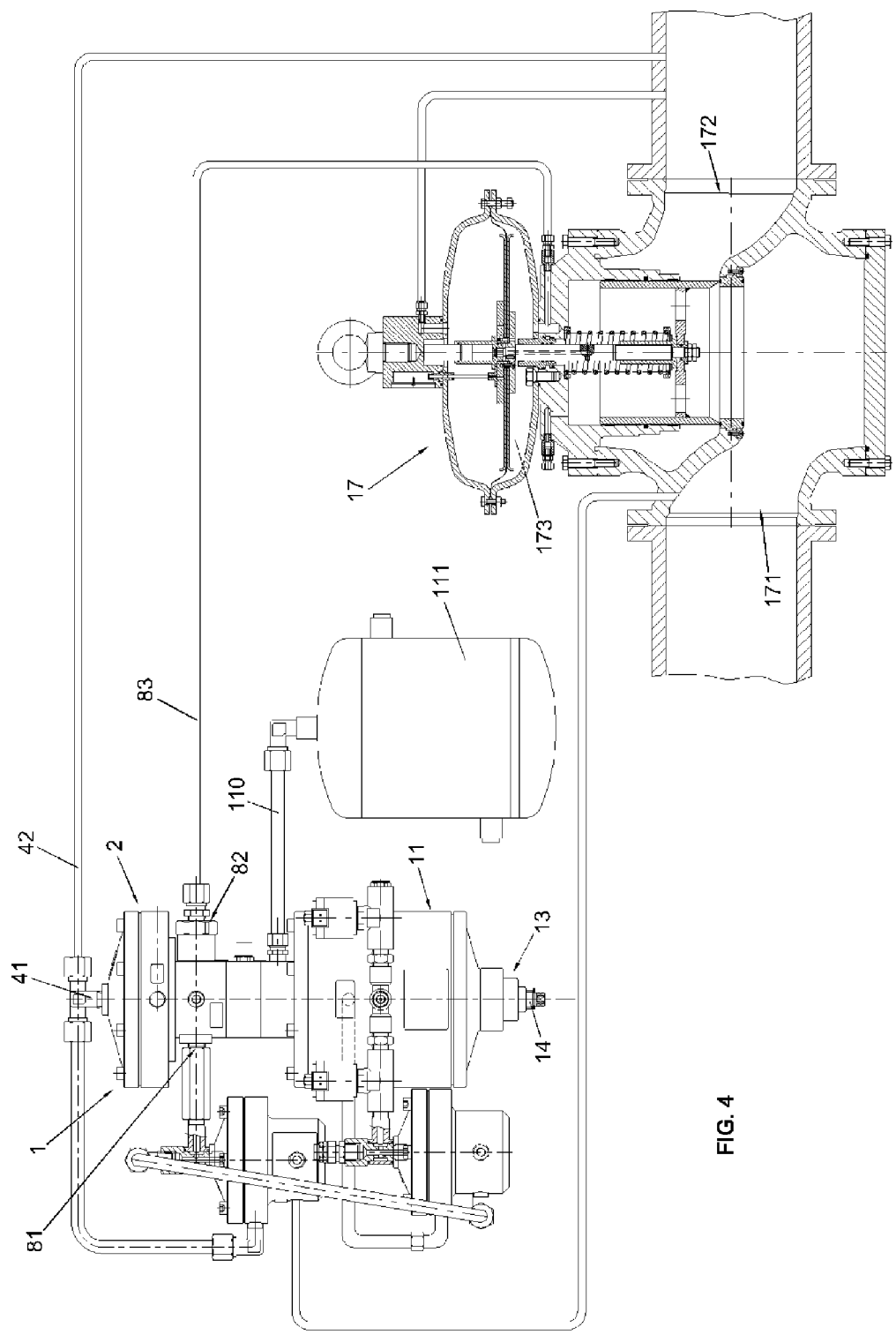
FIG. 4 is a schematic drawing which shows the pilot connected to a pressure regulator.

As can be seen in FIGS. 1 and 4, the pilot device that is the subject of the invention and is indicated as a whole by 1 is provided with a head 2 consisting of two chambers separated by a first elastic membrane 3; the outlet pressure of the gas pressure regulator 17, functionally connected to the pilot device, reaches the upper chamber, indicated by 4, via the hole 41, connected to a pipe 42.

While the downstream pressure at the gas pressure regulator outlet 172 is established in chamber 4, chamber 5, which is the lower chamber of the head 2, is at atmospheric pressure since it communicates with the atmosphere via the hole 51.

As can be easily seen, the membrane 3 remains balanced, having on one side the pressure of the chamber 4, which is the pressure at the gas pressure regulator outlet 172, and on the other side, i.e. in the chamber 5, the atmospheric pressure, the thrust of which on the first membrane 3 is integrated by the action of an axial unit exerting thrust on said first membrane and indicated as a whole by 6.

The unit 6 consists of a first block 61 fastened to the membrane 3 and connected to a second block 62 fastened to the second membrane 71.

The second block 62 includes the lower part of portion 63, while in a central position it has a chamber to house a motorization regulation unit 8 with an inlet 81 connected to a supply pressure deriving from the inlet pressure 171 of the gas pressure regulator, but not necessarily coinciding with it, and an outlet hole 82 which, via a pipe 83, is connected to the motorization chamber 173 of the head of the gas pressure regulator.

The motorization gas flows out of the outlet hole 82 at a motorization pressure obtained by reducing the supply pressure by means of one or more laminations. The motorization gas thus reaches the motorization chamber of the gas pressure regulator control head.

The second block 62 with the regulation unit 8 is positioned between the second membrane 71 and a third membrane 72 which make said block axially sliding due to the elasticity of said membranes 71 and 72.

Under the third membrane 72 there is an intermediate chamber 9 communicating directly with the atmosphere via the hole 91.

Under said chamber 9, the pilot device is provided with a compensation chamber 10 sealed with respect to the outside and defined at the top by the rigid wall 101, laterally by the cylindrical wall 102 and at the bottom by a further membrane 73.

A third block 64 is anchored to the further membrane 73, wherein said block emerges on one side in the chamber 10 and, on the other side of the further membrane 73, it emerges at the bottom and is in contact with the mechanical elastic means for the basic setting of the pilot constituted, in the case of the example, by the spring 12.

The spring 12 is provided with a pre-loading device 13 consisting of an adjusting screw 14 and a disc 15 where the base of the spring 12 rests.

Naturally, when the screw 14 is tightened on the thread of the block 16, the disc 15 moves upward and loads the spring 12.

The thrust of the spring 12 is transmitted to the second block 62 via the third block 64 and the stems 65 and 66.

As can be seen in FIG. 1, under the compensation chamber 10 there is a tank 11 which contains the spring 12.

A load pressure $P_1$ is introduced into said tank 11 via the inlet 120, while the atmospheric pressure indicated by $P_2$ is present in the compensation chamber 10.

In order to ensure comparable volumes for the loading chamber 11 and the compensation chamber 10 and therefore similar thermal inertia, said compensation chamber 10 is connected to a tank 111 by means of a pipe 110. The presence of the tank 111 connected to the compensation chamber 10, though not being strictly necessary, actually increases the volume of the compensation chamber, consequently ensuring insensitiveness to temperature variations and to other problems such as external micro-leaks of gas.

As can be seen in FIG. 1, the further membrane 73 is common to the compensation chamber 10 and to the load tank 11.

This particular arrangement of the chambers 10 and 11 having the further membrane 73 in common, but with different pressure in said chambers, i.e. with pressure $P_1$ higher than the atmospheric pressure $P_2$ of the compensation chamber 10, minimises the effects of the temperature difference to which the pilot device is subjected in the event of a failure of the loading pressure regulation system.

In said case the negative effects of the temperature variation would necessarily be reflected on the setting of the pilot device in a wholly uncontrolled manner, i.e. only as a result of temperature variations with the obvious risk of affecting the safety conditions.

Figure 3:
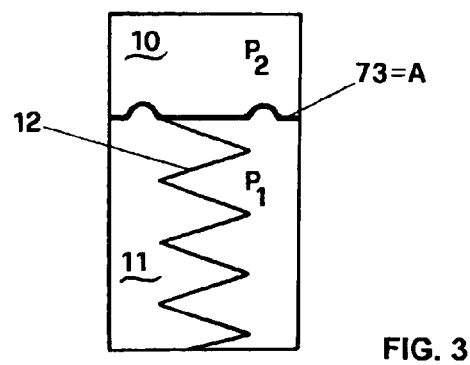
FIG. 3 is a schematic drawing which shows the interaction between pilot tank and compensation chamber.

To better highlight the effect of the closed volume compensation chamber 10 maintained at atmospheric pressure on the setting of the pilot in the event of thermal variation, we will use the schematic FIG. 3 and some calculation expressions that better show the results achieved with the invention.

With reference to FIG. 3:
$P_1$=absolute pressure in tank 11 at initial reference temperature $T_0$
$P_2$=absolute pressure in compensation chamber 10 at initial temperature $T_0$
$P_{1T}$=absolute pressure in tank 11 at temperature T
$P_{2T}$=absolute pressure in compensation chamber at temperature T
A=thrust surface area of further membrane 73.

The thrust exerted on the surface area A at temperature $T_0$ will be the sum of the thrust exerted by the spring $S_M$ and the pressure of the two chambers on the surface A i.e. $S_0 = S_M + P_1 A - P_2 A$ while at temperature T the resulting thrust will be $$S_T = S_M + P_{1T}A - P_{2T}A$$

where $$P_{1T} = P_1 \cdot \frac{T}{T_0} \text{ and } P_{2T} = P_2 \cdot \frac{T}{T_0}$$

It should be noted that the setting of the pilot device, i.e. the pressure regulated by the gas pressure regulator in the outlet duct 172, depends only on the loads So and ST, in fact it varies proportionally to said loads.

Therefore with the compensation chamber 10, the difference of the total thrust action on the surface A will be given by the expression $$\Delta S_c = S_T - S_0$$

i.e.

$$\Delta S_c = A \left[ P_1 \cdot \left( \frac{T}{T_0} - 1 \right) - P_2 \cdot \left( \frac{T}{T_0} - 1 \right) \right]$$

The pressure $P_2$, as we have said, is equal to the atmospheric pressure, so that we can write $P_2 = P_{atm}$, while the pressure $P_1$ is equal to the load pressure increased by the atmospheric pressure, i.e. $P_1 = P_c + P_{atm}$.

The thrust variation difference $\Delta S_c$ with compensation chamber, due to the temperature variation, will therefore be $$\left[ \Delta S_c = A \cdot P_c \left( \frac{T}{T_0} - 1 \right) \right]$$

In order to better highlight the effects of the invention, i.e. of the presence of the compensation chamber 10, we will now calculate the same thrust variation without the presence of the compensation chamber 10, i.e. according to the known art.

In said case, the thrust on the surface A at temperature $T_0$ will be $$S_0 = S_M + P_1 A - P_2 A$$

At temperature T we will have $$S_T = S_M + P_{1T}A - P_2 A$$

Note that while $$P_{1T} = P_1 \cdot \frac{T}{T_0},$$

since the pressure $P_1$ belongs to the closed volume 11, the pressure $P_2$ at the temperature $T_0$, and also at the temperature T, remains the same in the absence of a closed volume, said pressure being always equal to the atmospheric pressure, hence $$P_2 = P_{atm}$$

Consequently, the thrust variation $\Delta S_a$, without the compensation chamber, will be $$\Delta S_a = S_T - S_0 = P_{1T}A - P_1 A = A \cdot P_1 \left( \frac{T}{T_0} - 1 \right)$$

i.e.

$$\Delta S_a = A \cdot (P_c + P_{atm}) \cdot \left( \frac{T}{T_0} - 1 \right)$$

If we now compare the two expressions $\Delta S_c$ and $\Delta S_a$, i.e. the thrust variation with the compensation chamber and without the compensation chamber, it can be seen that the difference between the two expressions consists in the entity $P_c$ with the compensation chamber and in the entity $P_c + P_{atm}$ without the compensation chamber.

Since the pressure $P_c$ is a fraction of the atmospheric pressure, generally from a few dozen mbars to a few hundred mbars, assuming for example $P_c = 50$ mbars we have the value $P_c = 0.050$ bars while the value $P_c + P_{atm} = 0.05 + 1 = 1.05$ bars, assuming an atmospheric pressure of 1 bar abs.

The above clearly shows that the reduction ratio of the temperature effect between a pilot device with compensation chamber at atmospheric pressure and without compensation chamber is 0.050:1.050 i.e. over at least 21 times less.

With $P_c = 250$ mbars the effect of the temperature would be 5 times less.

The object of the invention is thus achieved, i.e. drastic reduction in the effect of the temperature variation on the setting value of the pilot device immediately prior to occurrence of a failure in the pilot tank loading pressure control system, with all the resulting beneficial effects.

The invention claimed is:

1. Pilot device suited to cooperate with a pressure regulator suitable for use in gas distribution systems, said regulator having high pressure at an inlet and low pressure at an outlet, said pilot device comprising:
- a head having two chambers separated by a first membrane, an upper chamber being at the outlet pressure of said pressure regulator and a lower chamber being at atmospheric pressure;
- a body provided with mechanical elastic setting means connected to an axial thrust unit acting on said first membrane and cooperating with a regulation unit having at a regulation unit inlet a supply pressure which provides a motorization gas at a regulation unit output, said gas being transferred into ducts connected to a motorization chamber of said pressure regulator, said pilot device featuring a tank having a wall with a further membrane provided with said mechanical elastic setting means, gas being conveyed to said tank with a load pressure suited to modify the thrust of said mechanical setting means on said axial thrust unit, wherein the pilot device is provided with a closed compensation chamber arranged between said tank and said head, and having in common with said tank said further membrane;
  wherein between said head and said compensation chamber there is an intermediate chamber communicating with the free atmosphere.

2. Pilot device suited to cooperate with a pressure regulator suitable for use in gas distribution systems, said regulator having high pressure at an inlet and low pressure at an outlet, said pilot device comprising:
- a head having two chambers separated by a first membrane, an upper chamber being at the outlet pressure of said pressure regulator and a lower chamber being at atmospheric pressure;
- a body provided with mechanical elastic setting means connected to an axial thrust unit acting on said first membrane and cooperating with a regulation unit having at a regulation unit inlet a supply pressure which provides a motorization gas at a regulation unit output, said gas being transferred into ducts connected to a motorization chamber of said pressure regulator, said pilot device featuring a tank having a wall with a further membrane provided with said mechanical elastic setting means, gas being conveyed to said tank with a load pressure suited to modify the thrust of said mechanical setting means on said axial thrust unit, wherein the pilot device is provided with a closed compensation chamber arranged between said tank and said head so that the closed compensation chamber is outside of the tank, and having in common with said tank said further membrane.

3. Pilot device according to claim 2), wherein said compensation chamber is connected by means of a pipe to an additional closed tank.

4. Pilot device according to claim 2), wherein between said head and said compensation chamber there is an intermediate chamber communicating with the free atmosphere.

5. Pilot device according to claim 2, wherein it is provided with a device for pre-loading the mechanical elastic setting means, said device having an adjusting screw and a disc on which said elastic means rest.

6. Pilot device according to claim 2, wherein said tank and said compensation chamber are arranged so as to be exposed to ambient temperature, in such a way that the temperature of both gases in said tank and in said compensation chamber corresponds to said ambient temperature.

7. Pilot device according to claim 2, wherein said regulation unit is pneumatically isolated from the head and from an intermediate chamber by means of a second membrane near to said head and of a third membrane near to said intermediate chamber.

8. Pilot device according to claim 7, wherein said axial thrust unit consists of:
- a first block connected to said second membrane of said head and joined to
- a second block between said second membrane and said third membrane;
- a third block incorporating said further membrane, said third block and said second block being axially connected by means of at least one stem.

* * * * *